United States Patent
Swarr et al.

(10) Patent No.: US 12,476,834 B2
(45) Date of Patent: Nov. 18, 2025

(54) APL FIELD SWITCH WITH DYNAMIC POWER ALLOCATION

(71) Applicant: Phoenix Contact Development and Manufacturing, Inc., Middletown, PA (US)

(72) Inventors: Lonnel J. Swarr, Mannheim, PA (US); David N. Katz, Hummelstown, PA (US); Jason Alan Norris, Stow, OH (US); Brian John Gillespie, Mount Joy, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 279 days.

(21) Appl. No.: 18/269,492

(22) PCT Filed: Feb. 23, 2022

(86) PCT No.: PCT/US2022/017477
§ 371 (c)(1),
(2) Date: Jun. 23, 2023

(87) PCT Pub. No.: WO2022/182727
PCT Pub. Date: Sep. 1, 2022

(65) Prior Publication Data
US 2024/0056320 A1   Feb. 15, 2024

Related U.S. Application Data

(60) Provisional application No. 63/152,432, filed on Feb. 23, 2021.

(51) Int. Cl.
*H04L 12/10* (2006.01)

(52) U.S. Cl.
CPC .................................. *H04L 12/10* (2013.01)

(58) Field of Classification Search
CPC ..... H04L 27/00; H04L 27/0002; H04L 12/02; H04L 12/10; H04L 12/28; H04L 12/40;
(Continued)

(56) References Cited

U.S. PATENT DOCUMENTS 6,996,458 B2 *   2/2006   Pincu ........................ H02J 1/10
                                                       700/297
7,337,336 B2 *   2/2008   Ferentz .................. H04L 12/10
                                                       713/300
(Continued)

FOREIGN PATENT DOCUMENTS

DE   102019213322 A1   3/2021
EP       1798713 A1   6/2007
(Continued)

OTHER PUBLICATIONS

European Patent Office, Machine Translation into English of the specification and claims of DE102019213322, Jul. 26, 2023, 18 pages.

(Continued)

*Primary Examiner* — James M Perez
(74) *Attorney, Agent, or Firm* — Hooker & Habib, P.C.

(57) ABSTRACT

An APL field switch includes a number of ports that transmit power to APL field devices connected to spurs extending from the ports. The APL Power Class of each port can be dynamically set by a user to enable more efficient allocation of power to the ports to meet the needs of the connected field devices.

20 Claims, 10 Drawing Sheets

(58) Field of Classification Search
CPC ......... H04L 12/40006; H04L 12/40032; H04L 12/40039; H04L 12/40045; H04L 25/02; H04L 25/03; H04L 25/026; H04L 25/0264; H04L 25/0272; H04L 25/028; H04L 25/0292; H04L 25/03006; H04L 25/03012; H04L 25/03114; H04L 2012/40267; H04L 2012/40273; H04L 2025/0335; H04B 3/00; H04B 3/54; H04B 3/542; H04B 3/544; H04B 3/548
See application file for complete search history.

(56) References Cited

U.S. PATENT DOCUMENTS

| | | | | |
|---|---|---|---|---|
| 7,441,133 | B2* | 10/2008 | Giat | H04L 12/10 713/340 |
| 7,776,528 | B2* | 8/2010 | Lakowicz | C12Q 1/682 435/7.1 |
| 7,849,333 | B2* | 12/2010 | Schindler | H04L 12/10 713/300 |
| 7,895,456 | B2* | 2/2011 | Ferentz | H04L 12/12 713/300 |
| 8,082,457 | B2* | 12/2011 | Randall | G06F 1/3203 713/320 |
| 8,205,102 | B2* | 6/2012 | Kabbara | H04L 12/10 713/1 |
| 8,266,463 | B2* | 9/2012 | Jonnala | G06F 1/28 713/340 |
| 8,325,710 | B2* | 12/2012 | Emmanuel | H04L 1/1671 455/343.1 |
| 8,352,754 | B2* | 1/2013 | Chin | H04L 12/10 713/323 |
| 9,088,434 | B2* | 7/2015 | Diab | H04L 12/40045 |
| 9,264,240 | B2* | 2/2016 | Hiscock | H02J 1/14 |
| 9,544,499 | B2* | 1/2017 | Herzel | H04N 7/181 |
| 9,689,929 | B2* | 6/2017 | Graber | G01R 31/40 |
| 9,703,650 | B1* | 7/2017 | Byers | G06F 1/30 |
| 9,832,028 | B2* | 11/2017 | Picard | G06F 1/266 |
| 9,874,930 | B2* | 1/2018 | Vavilala | G06F 1/266 |
| 10,069,686 | B2* | 9/2018 | Chan | H04L 12/10 |
| 10,133,648 | B2* | 11/2018 | Hamdi | G06F 1/266 |
| 10,320,576 | B1* | 6/2019 | Butler | H04L 12/10 |
| 10,543,554 | B2* | 1/2020 | Trinnes | B23K 9/1043 |
| 10,732,704 | B2 | 8/2020 | Vavilala et al. | |
| 10,764,071 | B1* | 9/2020 | Ciholas | G06F 11/3058 |
| 10,797,893 | B2* | 10/2020 | Bains | H04L 5/14 |
| 10,817,037 | B2* | 10/2020 | Chen | G06F 1/263 |
| 10,848,329 | B2* | 11/2020 | Karnik | H04L 41/0677 |
| 11,201,753 | B1* | 12/2021 | Barzegar | H04L 12/10 |
| 11,256,238 | B1* | 2/2022 | Nixon | G05B 19/4185 |
| 11,500,347 | B2* | 11/2022 | Mathews | G05B 19/0423 |
| 11,531,325 | B2* | 12/2022 | Nixon | H04L 41/0806 |
| 11,750,407 | B2* | 9/2023 | Synstelien | H04L 12/10 375/257 |
| 11,815,871 | B2* | 11/2023 | Mathews | G05B 19/0423 |
| 12,218,775 | B2* | 2/2025 | Schnaare | H04L 69/08 |
| 12,255,973 | B2* | 3/2025 | Nixon | H04L 69/08 |
| 12,301,380 | B2* | 5/2025 | Swarr | H04L 41/022 |
| 12,362,330 | B2* | 7/2025 | Or-Bach | H01L 23/481 |
| 2004/0230846 | A1* | 11/2004 | Mancey | H04L 12/10 713/300 |
| 2006/0089230 | A1* | 4/2006 | Biederman | H04L 12/10 477/34 |
| 2006/0112285 | A1* | 5/2006 | Stineman | H04L 12/10 713/300 |
| 2006/0212724 | A1* | 9/2006 | Dwelley | H04L 12/10 713/300 |
| 2008/0114998 | A1* | 5/2008 | Ferentz | H04L 12/12 713/324 |
| 2008/0168283 | A1* | 7/2008 | Penning | G06F 1/263 713/310 |
| 2008/0244284 | A1* | 10/2008 | Karam | G01R 21/00 713/300 |
| 2009/0041004 | A1* | 2/2009 | Emmanuel | H04L 1/188 370/352 |
| 2011/0283118 | A1* | 11/2011 | Maniktala | G06F 1/266 713/300 |
| 2012/0188865 | A1* | 7/2012 | Michaelis | G01R 31/68 370/200 |
| 2014/0129856 | A1* | 5/2014 | Bertin | G06F 1/266 713/320 |
| 2015/0304508 | A1* | 10/2015 | Peker | H04M 19/08 379/24 |
| 2016/0064938 | A1* | 3/2016 | Balasubramanian | H04L 12/10 307/11 |
| 2018/0190395 | A1* | 7/2018 | Clarkson | G05B 9/03 |
| 2018/0367319 | A1* | 12/2018 | Hamdi | G06F 1/3209 |
| 2019/0312777 | A1* | 10/2019 | Toillon | H04L 12/28 |
| 2019/0385057 | A1* | 12/2019 | Litichever | H04L 63/14 |
| 2020/0105439 | A1* | 4/2020 | Kennefick | H01B 3/302 |
| 2020/0106639 | A1* | 4/2020 | Pannell | H04L 12/40136 |
| 2021/0006432 | A1* | 1/2021 | Krieger | H04L 12/40163 |
| 2021/0067193 | A1* | 3/2021 | Dai | H04B 3/50 |
| 2021/0075520 | A1* | 3/2021 | Soto | H04L 12/10 |
| 2021/0081346 | A1* | 3/2021 | Nixon | G05B 19/4185 |
| 2021/0144207 | A1* | 5/2021 | Yasay | H04L 67/1097 |
| 2021/0181701 | A1* | 6/2021 | Mathews | H04L 12/40032 |
| 2022/0021548 | A1* | 1/2022 | Goergen | G06F 1/266 |
| 2022/0075352 | A1* | 3/2022 | Nixon | G05B 19/042 |
| 2022/0075354 | A1* | 3/2022 | Nixon | H04L 41/0806 |
| 2022/0078238 | A1* | 3/2022 | Nixon | G06F 9/4401 |
| 2022/0078252 | A1* | 3/2022 | Nixon | G05B 19/4185 |
| 2022/0078267 | A1* | 3/2022 | Nixon | H04L 69/14 |
| 2022/0128976 | A1* | 4/2022 | Nixon | G05B 19/042 |
| 2022/0224108 | A1* | 7/2022 | Doynov | G01R 31/327 |
| 2022/0316934 | A1* | 10/2022 | Hengstler | G01D 7/005 |
| 2022/0317666 | A1* | 10/2022 | Friesen | G05B 19/4188 |
| 2022/0319791 | A1* | 10/2022 | Geppert | H04B 1/04 |
| 2023/0006864 | A1* | 1/2023 | Gottron | H02H 9/008 |
| 2023/0022233 | A1* | 1/2023 | Rauer | H04L 67/12 |
| 2023/0074008 | A1* | 3/2023 | Mathews | H04L 12/40032 |
| 2023/0274631 | A1* | 8/2023 | Welle | G01D 21/00 340/870.02 |
| 2023/0318875 | A1* | 10/2023 | Swarr | G06F 13/4282 370/254 |
| 2023/0352931 | A1* | 11/2023 | Pohl | H02H 9/008 |
| 2023/0387674 | A1* | 11/2023 | Pohl | H02H 3/08 |
| 2024/0022524 | A1* | 1/2024 | Bibernell | G05B 19/042 |
| 2024/0045417 | A1* | 2/2024 | Körnle | G05B 23/0272 |
| 2024/0053728 | A1* | 2/2024 | Jung | G05B 19/4155 |
| 2024/0056320 | A1* | 2/2024 | Swarr | H04L 12/10 |
| 2024/0118679 | A1* | 4/2024 | Brown | G05B 19/4186 |
| 2024/0118681 | A1* | 4/2024 | Mahajan | G05B 19/418 |
| 2024/0118798 | A1* | 4/2024 | Ritchie | H04L 67/025 |
| 2024/0120767 | A1* | 4/2024 | Chaney | H02J 9/00 |
| 2024/0121126 | A1* | 4/2024 | Ritchie | H04L 12/2801 |
| 2024/0121195 | A1* | 4/2024 | Chaney | H04L 49/351 |
| 2024/0129145 | A1* | 4/2024 | vom Stein | H04L 12/10 |
| 2024/0134841 | A1* | 4/2024 | Ubach | H04L 67/12 |
| 2024/0201667 | A1* | 6/2024 | Ens | G05B 19/41835 |
| 2024/0204510 | A1* | 6/2024 | Korolev | H02H 9/02 |
| 2024/0205041 | A1* | 6/2024 | Schnaare | H04L 12/2801 |
| 2024/0379624 | A1* | 11/2024 | Or-Bach | H01L 25/18 |
| 2025/0184707 | A1* | 6/2025 | Tamura | H04L 65/1104 |

FOREIGN PATENT DOCUMENTS

| | | |
|---|---|---|
| EP | 2784977 A1 | 10/2014 |
| JP | 2009106127 A | 5/2009 |
| WO | 2018184766 A1 | 10/2018 |

OTHER PUBLICATIONS

European Patent Office, Machine Translation into English of the specification and claims of EP2784977, 9 pages.
European Patent Office, Machine Translation into English of the specification and claims of WO2018184766, 18 pages.
International Search Report in PCT/US2022/17477, Jun. 1, 2022, European Patent Office, 10 pages.

(56) References Cited

OTHER PUBLICATIONS

European Patent Office, English-language machine translation of the specification and claims of JP2009106127A, downloaded Sep. 12, 2024, 21 pages.
Japan Patent Office, office action dated Aug. 29, 2024 in corresponding Japanese Patent Application No. 2023-541713, 5 pages.
English-language translation of Japan Patent Office office action dated Aug. 29, 2024 in corresponding Japanese Patent Application No. 2023-541713, 6 pages.

* cited by examiner

APL FIELD SWITCH WITH DYNAMIC POWER ALLOCATION

RELATED APPLICATION

This application claims priority to and the benefit of the filing date of U.S. Patent Application 63/152,432 filed Feb. 23, 2021 and entitled "APL FIELD SWITCH WITH DYNAMIC POWER ALLOCATION", which priority application was pending on the filing date of this application and is incorporated by reference as if fully set forth herein.

FIELD OF THE DISCLOSURE

The disclosure relates generally to APL field switches for use in process control networks.

BACKGROUND OF THE DISCLOSURE

The Ethernet Advanced Physical Layer (APL) specification is based on an industry standard (IEEE 802.3cg) for the physical layer for an Ethernet based, two-wire process control network. An Ethernet-APL network enables data rates of up to 10 Megabits per second (Mbps) full duplex. The Ethernet-APL network supports data transmission distances of up to 1,000 meters, power transmission over the same two wires that transmit data, multidrop, intrinsic safety, Ethernet connections to field devices, and other process control needs.

The basics of Ethernet networking can be found in a number of books, including, for example, Sterling & Wissler, *The Industrial Ethernet Networking Guide,* 2003 (ISBN 0-7668-4210-X), published by Delmar Learning.

Transmitting power and Ethernet formatted data over two wires is referred to generically herein as "Power over Data" or PoD. Power and Ethernet data can be transmitted over the same twisted pair of wires because the power domain and the data domain reside in different frequency domains. Being in different frequency domains enables power and data to be carried simultaneously on the same twisted wire pair and yet be separated into individual DC power and AC data components when necessary.

An Ethernet-APL network utilizes a trunk and spur topology. The APL two-wire trunk can transmit high power for long runs of up to 1,000 meters. APL two-wire spurs carry lower power for shorter runs from the trunk to field devices, up to 200 meters.

APL field switches connect the APL trunk to APL spurs extending from the field switch. The field switch includes a number of ports for connecting the spurs to the field switch. Each port forms part of a respective channel that includes a power/data line connected to the port that transmits power received into the APL field switch to the port and transmits Ethernet data between the port and the APL trunk. Each power/data line includes a power line segment that transmits power only and a data line segment that transmits data only. An Ethernet switch in the data line segment receives and transmits Ethernet data through the data line segment. Power and data is transmitted through the two-wire spur connecting the port and a field device.

The APL field switch receives power for distribution to the field switch ports through the network trunk itself or from an external auxiliary DC power source. An auxiliary DC power source typically delivers more power than what is available through the network trunk. As a result, the total power available to the APL field switch available to ports depends on the power source—the trunk or auxiliary DC source. The maximum power sent through the ports cannot exceed the power received into the APL field switch.

APL field switches may also "cascade", that is, an upstream APL field switch may provide power to a downstream APL field switch. Thus the total power supplied to the upstream APL field switch must be sufficient to power the field devices attached to the upstream APL field switch and to power the field devices attached to the downstream APL field switch (and any further downstream APL field switches).

The APL standard defines multiple Power Classes that can be applied to each port of the APL field switch. A Power Class defines the maximum power available at a port that can be transmitted through a spur connected to the port. For purposes of description it is assumed the APL standard defines four Power Classes, each Power Class associated with a different maximum power output: Power Class A, Power Class B, Power Class C, and Power Class D.

Each Power Class is associated with a power profile having predefined voltage and power parameters that define the maximum power output of the port. Some Power Classes allow more power output than other Power Classes.

Each field device attached to a port through a spur has its own independent power requirement that may differ among the attached field devices. A field device must be attached to a port associated with a Power Class sufficient to power the field device.

But an APL field switch is manufactured having a set number of ports (for example, 8, 12, 16, or 24 ports). Thus the APL field switch must limit the number and types of Power Classes associated with the set number of ports to comply with maximum power requirements. For example, a manufacturer may provide multiple models of a 24-port APL field switch, each model with ports having a different combination of associated Power Classes.

The number of APL field switch models for each set number of ports can be overwhelming, requiring the manufacturer to comprise and offer just a subset of the different possible combinations. Customers will also have to make compromises in their field switch selections. Additionally, customers may have to accept the manufacturer's choice of location of the ports of each Power Class (left side, right side, etc.)

An APL field switch customer may have use cases with varying numbers of field devices attached to the field switch, and different required Power Classes to deliver adequate power to the different field devices attached to the ports.

The customer may inadvertently specify an APL field switch during provisioning of the industrial control network based on the wrong combination of ports and power profiles and, at install time, realize that the chosen APL field switch is unsuitable and must be replaced (or the system must be redesigned to accommodate the APL field device).

Thus there is a need for an APL field switch that can provide dynamic power allocation to ports to meet the specific needs of the customer and to changes in field switch power supply and changes in the field devices being attached to the APL field switch

SUMMARY OF THE DISCLOSURE

Disclosed is an APL field switch that provides dynamic power allocation to each port. A customer can purchase an APL field switch with the desired number of ports, and after purchase a user can selectively change the Power Class of each port to meet the needs of the industrial control network. A manufacturer can sell models of APL field switches that differ only in the number of provided ports, and yet be assured that users can associate the ports after purchase with different combinations of Power Classes.

The disclosed APL field switch can be powered by either the APL network trunk or by an auxiliary DC power supply. The total power made available to the ports cannot exceed the power provided to the APL field switch (less any power needed to power the APL field switch itself).

The APL field switch provides a default Power Class allocation to each port. The default Power Class allocation may depend on the power source connected to the APL Field Switch. The total allocated power cannot exceed the total power available to the ports.

A user can selectively change a port's Power Class but the power allocated to the ports cannot in sum exceed the total power available to the APL field switch.

The APL field switch is provided with a default set of port Power Class allocations for each type of connected power source: trunk or auxiliary DC power supply. The default allocation sets the default Power Class for each port. Different ports may be allocated different default Power Classes.

APL field switch software enables the user to re-configure the APL field switch during commissioning and during runtime within the allowable limits of the APL field switch hardware and the power supplied to the APL field switch.

Example default configurations based on type of power source:
Auxiliary DC Power Supply
  All field switch ports are configured for Class B (relatively higher) power operation, and cascade operation will be enabled.
Power through Trunk
  All field switch ports are configured for Class A (relatively lower) power operation, and cascade operation will be disabled.

The APL field switch software enables the user to override the default port Power Class allocations through a software application. The application will enforce the rule that no user configuration can exceed the power capabilities of the APL Field Switch.

When powered through the trunk, the software application limits the user to a maximum number of Class B spurs available based on the available power budget defined by the trunk power source.

In this example configuration, a Power Class will be enforced independently for each port by setting an inline, selectable-current-limiting device to the appropriate current limit for the port Power Class. A current-limiting device is a device placed in a circuit that activates should the current exceed a predetermined maximum current flow (amperage), thereby interrupting the circuit and stopping current flow or otherwise reducing current flow in the circuit to a safe level. The current-limiting device limits the maximum flow of electrical current through the port. Each Port Class is associated with a respective current flow or amperage limit.

Selectably adjustable current-limiting devices that can be installed in a circuit to selectively limit maximum amperage in a circuit are known and can be adapted for use in accordance with this disclosure.

For a non-limiting example, example, the selectable-current-limiting device includes an electronic fuse or eFuse An eFuse is an example of an all-electronic, selectable-current-limiting fuse that, when actuated if the current exceeds a predetermined amperage, stops current flow. The eFuse does not depend on the thermal heating and the subsequent open circuit of an inline element to stop current flow, reacts quickly, and can be reset easily. The eFuse is connected to a digital potentiometer that has selectable resistance. The resistance of the digital potentiometer sets the current limit that will open the eFuse. In turn, the Power Class of the port is determined by the current limit that will open the eFuse. A user in this embodiment sets the Port Class of the port by setting the resistance of the potentiometer.

Other objects and features of the disclosure will become apparent as the description proceeds, especially when taken in conjunction with the accompanying drawing sheets illustrating one or more illustrative embodiments.

DETAILED DESCRIPTION

Figure 1:
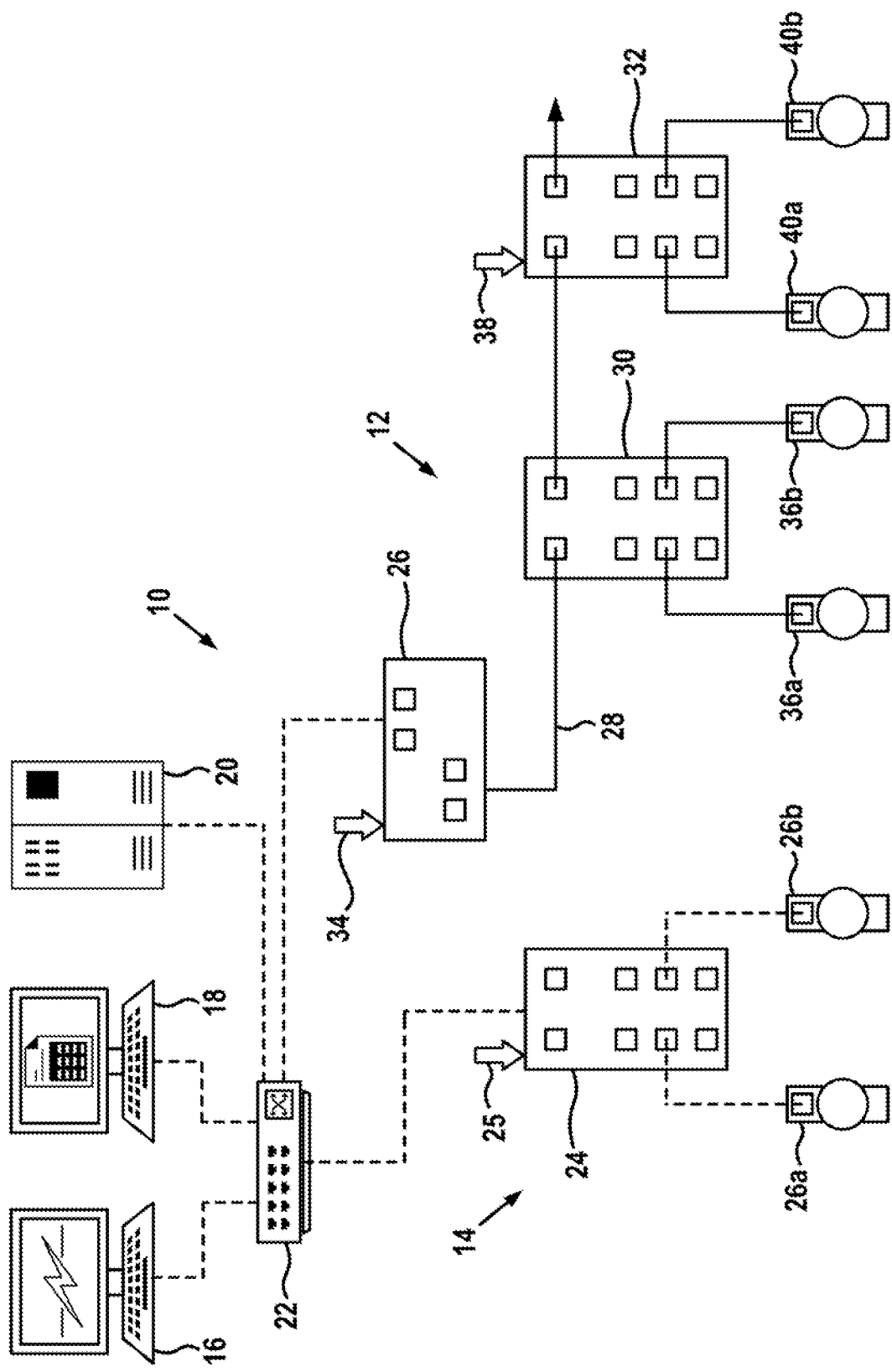
FIG. 1 illustrates a process control network including an APL field switch in accordance with this disclosure.

FIG. 1 illustrates a process control network 10 made up of a 10 Mbps Ethernet-APL process control network 12 and a 100 Mbps Industrial Ethernet process control network 14.

The APL-Ethernet process control network 12 conforms to the Ethernet Advanced Physical Layer (APL) specification. The APL-Ethernet network 12 uses two-wire trunk and two-wire spur cabling for simultaneous data transmission and power transmission over the two wires. The trunk and spurs of the APL-Ethernet process control network 12 are shown in solid lines in FIG. 1.

The illustrated Industrial Ethernet process control network 14 is an EtherNet/IP (Ethernet Industrial Protocol network). The Industrial Ethernet network 14 uses standard Ethernet CAT 5 or better Ethernet cable (referred to herein as "standard Ethernet cable") and associated hardware that is also commonly used in business Ethernet LAN networks. Standard Ethernet cables are shown in broken lines in FIG. 1.

The process control network 10 includes a backend having an engineering station 16, an operations station 18, a process controller 20, and a backend non-APL Ethernet switch 22. The backend stations, process controller, and Ethernet switch are connected by standard CAT 5 or better Ethernet cables for high speed Ethernet communications (100 Mbps or greater).

The Industrial Ethernet network 14 includes a non-APL Ethernet switch 24 connected to the backend Ethernet switch 22 by a standard CAT 5 or better Ethernet cable. The Industrial Ethernet switch 24 is powered by an auxiliary power supply represented by the arrow 25. The Industrial Ethernet switch 24 is connected to a non-APL field device 26a and a non-APL field device 26b by standard CAT 5 or better Ethernet cables. The field device 26a and field device 26b are powered by auxiliary power supplies and not through the network. The back end can communicate with the field devices 26a, 26b through the backend Ethernet switch 22 and the Industrial Ethernet switch 24.

The APL-Ethernet network 12 includes an APL power switch 26 connected to an APL trunk 28 that extends from the APL power switch to a downstream APL field switch 30, and then to a further downstream APL field switch 32. The APL power switch 26 receives power from an auxiliary DC power source represented by the arrow 34. The APL power switch 26 injects power into the APL trunk for the simultaneous transmission of power and data through the trunk.

The APL power switch 26 is connected for data transmission to the backend Ethernet switch 22 through a standard Ethernet CAT 5 or better cable. The APL power switch 26 converts between the 100 Mbps Ethernet transmitted through the standard Ethernet cable to the 10 Mbps Ethernet transmitted through APL-Ethernet two-wire cable to provide data communications between the APL-Ethernet network 12 and the back end Ethernet switch 22.

The APL field switch 30 is itself powered through the APL trunk 28. The APL field switch 30 transmits power received through the APL trunk to field devices attached to the APL field switch 30. The APL field switch 30 as shown in FIG. 1 is connected to a field device 36a and a field device 36b by respective APL spurs extending from ports of the APL field switch. The APL field switch 30 transmits both power and data to the field devices 36 through the ports connected to the field devices.

The APL field switch 32 is like the trunk-powered APL field switch 30 but is powered solely by an auxiliary power source represented by the arrow 38. The APL field switch 32 is not powered from the trunk 28 but receives and transmits data through the APL trunk 28. The APL field switch 32 as shown in FIG. 1 is connected to an APL field device 40a and an APL field device 40b by respective APL spurs extending from ports of the APL field switch. The APL field switch 32 transmits both power and data to the field devices 40 through the ports connected to the field devices.

The field devices 26, 36, 40 are sensors, actuators, and the like compatible with the network to which they are connected. The field devices output sensor data, operating status, command confirmations, diagnostics, and other outgoing network communications required for operation of the process control network 10 and/or are configured to receive commands, data requests, and other incoming network communications required for operation of the process control network 10.

The trunk-powered APL field switch 30 and the auxiliary DC powered APL field switch 32 each provide dynamic power allocation capability in accordance with this disclosure. As the two APL field switches shown in FIG. 1 are identical, only the APL field switch 30 will be discussed in detail.

Figure 2:
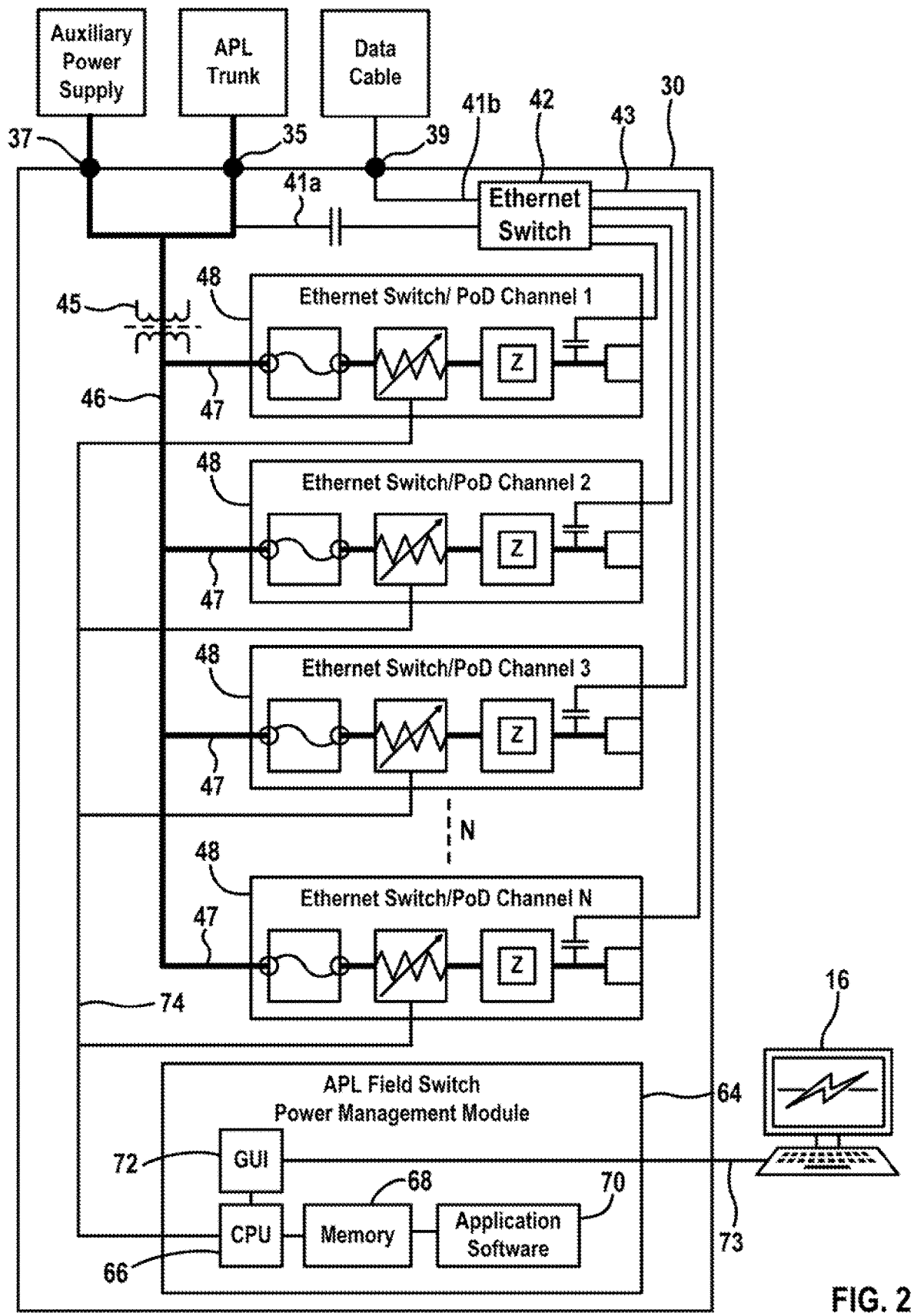
FIG. 2 illustrates an APL field switch in accordance with this disclosure.

FIG. 2 schematically illustrates components of the APL field switch 30 at least partially enclosed inside a case of the APL field switch. The APL field switch has trunk terminals 35 for connecting the field switch to an APL trunk 28 and external power supply terminals 37 for connecting the field switch to an auxiliary power supply (like the auxiliary power supply 38). The illustrated APL field switch 30 also includes one or more dedicated data terminals 39 that transmit data, and not power, into and out of the APL field switch 30. A dedicated data terminal 37 can be realized as an Ethernet RJ45 connector, an SFP optical connector, or the like for connection to a compatible external optical or electrical data cable.

When the APL field switch is powered by the APL trunk connected to the trunk terminals 35, the trunk terminals 35 function both as power terminals that receive power into the APL field switch and data terminals that transmit data between the APL trunk and the APL field switch. When the APL field switch is powered by an external power source connected to the external power supply terminals 37, the external power supply terminals 37 function as power terminals that receive power into the APL field switch and the trunk terminals 35 function as data terminals that transmit data between the APL trunk and the APL field switch. Each dedicated data terminal 43 functions only as a data terminal that transmits data into and out of the APL field switch 30.

Power received through the power terminals 35, 37 are received into the APL field switch 30 through a power line 46 connected to the terminals 35, 37. The power line 46 also transmits data into the APL field switch through the trunk terminals 35 and transmits data out of the APL field switch through the trunk terminals 35. A data line 41a extends between the power line 46 and one end of an Ethernet switch 42. The data line 41a extracts data from the power line 46 received through the trunk terminals 35 and transits the data to the Ethernet switch 42, and injects data received from the Ethernet switch 42 into the power line 46 for transmittal out through the trunk terminals 35. A data line 41b extends between each data terminal 39 and the one end of the Ethernet switch 42 for data transmission into and out of data terminals 39. The Ethernet switch 42 in turn has data lines 43 extending from the other end of the Ethernet switch to transmit data between the Ethernet switch and connected field devices.

Figure 3:
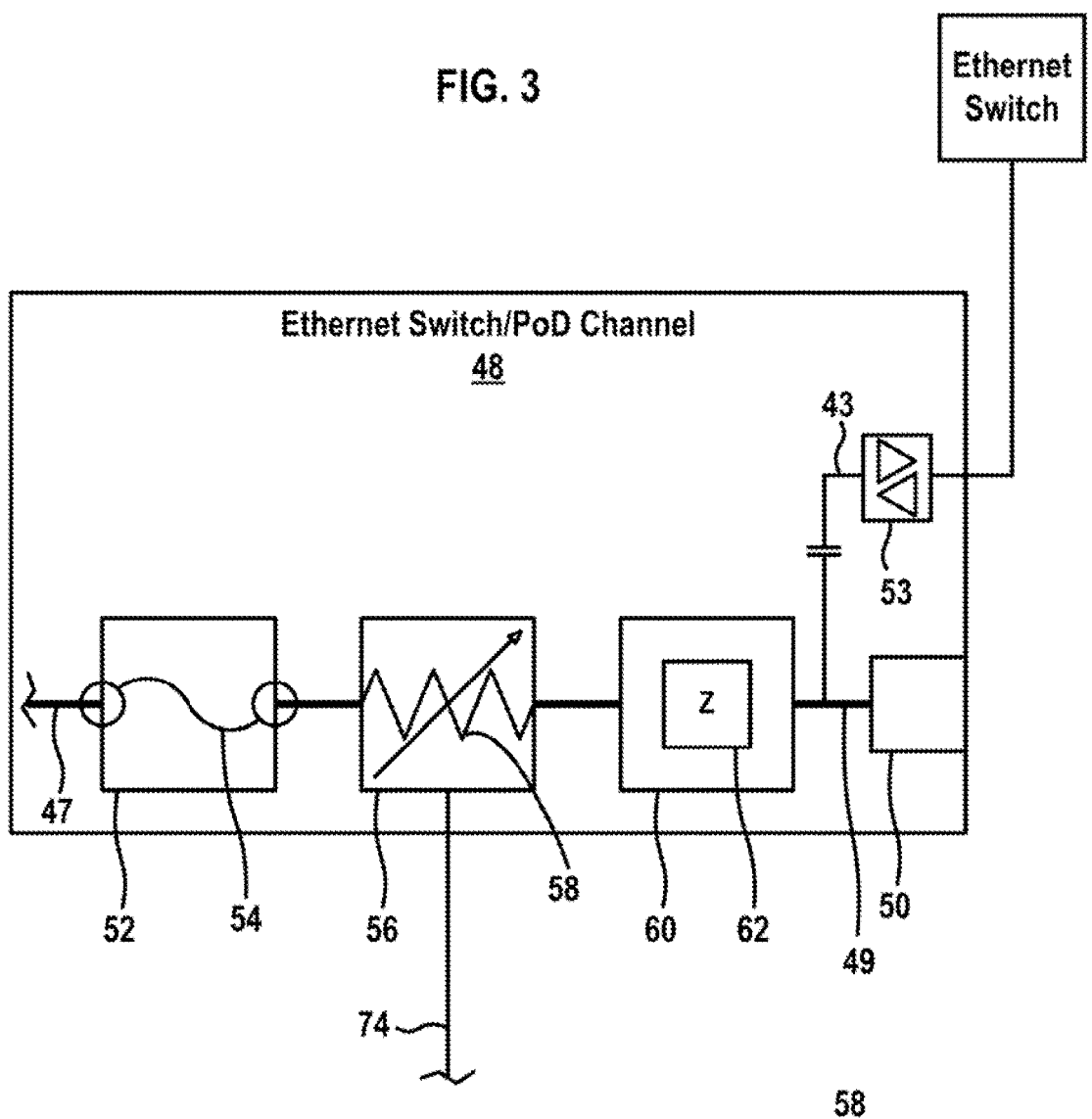
FIG. 3 is an enlarged view of a channel of the APL field switch shown in FIG. 2.

The APL field switch 30 has a number N of like channels 48 (a single channel 48 is shown schematically in more detail in FIG. 3). An isolated switching power supply 45 is disposed in the device line 46 between the terminals 42, 44 and the channels 48. Transmission of power and Ethernet-formatted data frames through the APL field switch 30 between the APL trunk 28 and the APL field switch ports is otherwise conventional except for the ability of the APL field switch 30 to provide dynamic power allocation to ports as set out in further detail below.

Each channel 48 includes a port 50 for attaching a spur to the channel 48. In the illustrated APL field switch, each port is formed as a two-wire Ethernet-compatible connector (referred to as a port connector herein). The port connector 50 may in alternative embodiments be configured as a screw or clamping terminal, M12 connector, or other connector compatible with the APL specification. Different styles or types of port connectors suitable for forming a port 50 may be provided by the APL field switch manufacturer, and a port may include multiple types of port connectors provided in parallel for greater connection flexibility in connecting a field device to the port.

The port 50 is connected to the power line 46 through a channel power line 47. The N channels 48 have respective channel power lines 47 extending in parallel from the power line 46 to the channel ports 50. The channel power line 47 transmits power through the channel. A Port Class associated with a port 50 is therefore also associated with the channel 48 that includes the port 50. The channel power line 47 is capable of transferring a maximum power. The actual power that can be transferred by the channel power line 47 in use at any particular time is limited to the maximum power of the Port Class associated with the channel at that time as discussed in greater detail below.

The channel power line 47 includes a power line segment 49 disposed between the port 50 and a connection with the channels data line 43 that also transmits data between the port 50 and the data line 43. Data for the channel received from the Ethernet switch 42 is injected into the channel power line 47 for transmission to the port 50 and data received into the channel power line 47 through the port 50 is extracted from the channel power line 47 for transmission to the Ethernet switch 42. An APL 10BaseT1L Ethernet physical layer transceiver 53 disposed in the data line 42 enables communication of Ethernet-formatted data frames between the port 50 and the Ethernet switch 42.

A channel 48 operates conceptually as an Ethernet switch that relays Ethernet data frames between the device power/data line 46 and the port 50, and as a PoD injector that injects power received from the device power/data line 46 into the channel power/data line 47. Depending on the design of the channel power/data line 47, the channel power/data line 47 may transmit power and data simultaneously on the same wires, or my transmit power and data on separate wires along at least a portion of the power/data line 47. The data line segment 51 may be connected directly to the device power/data line 46 and to the power/data line 47.

The channel 48 limits the energy transmitted through the port 50. Power flowing from the power line 46 through the channel power line 47 to the port 50 flows through intrinsic safety circuitry and other safety circuitry. The intrinsic safety circuitry limits power transmission in the event of a short circuit or other electrical faults. Circuit safety can be conceived as a number of power protection modules that operate in series and limit the current and voltage of the power transmitted through the two-wire spur to the field device. The designer of the APL field switch port can change the order, number, and circuit design of a port's power protection modules to meet design and safety requirements.

Power flowing through the channel power line 47 first flows through a maximum-current power protection module 52. The maximum-current protection module 52 includes a fuse 54 that limits the absolute maximum current flow through the channel power line 47.

The maximum-current power protection module 52 also isolates the channel power line 47 from the power supply source connected to the APL field switch. A second fuse can be included in the isolated portion of the channel power line 47.

The power flows from the maximum-current power protection module 52 to a current-limiting power protection module 56.

The current-limiting power protection module 56 sets the Power Class of the channel by setting the maximum current flow through the channel power line 47. The APL specification defines a number of Power Classes (the current APL specification definitions of the Power Classes may be subject to change, but each Power Class will be associated with a respective maximum power). A Power Class applicable to an APL field switch channel defines the maximum amount of power in watts at a maximum voltage that can be provided by a channel to the port 50. Power Classes A, B, and C are intended for intrinsically safe-rated channels for areas with explosive atmospheres but can also be used with ports not intended for intrinsically-safe use.

The current-limiting power protection module 56 includes a selectively adjustable current-limiting device 58 represented as a variable resistor in FIG. 3. Possible embodiments of the user-adjustable current-limiting device are described later below. The user can selectively set the maximum current flow (amperage) that will activate the current-limiting device to prevent the current flow from exceeding the set maximum current flow that can be transmitted through the port 50. User selection of the Power Class of a channel 48 by way of setting the maximum current setting of the current-limiting device is discussed in greater detail below.

The power flows from the current-limiting power protection module 56 to a voltage power protection module 60. The power protection module 60 prevents an overvoltage or surge condition and can be realized as a crowbar circuit represented by the impedance 62. A crowbar circuit operates by putting a short circuit or low resistance path across the voltage output. A crowbar circuit may be implemented using, for example, a thyristor, TRIAC, trisil, or thyratron as the shorting device.

As shown in FIG. 2, the APL field switch 30 includes a power management module 64. The power management module 64 enables a user to set the Power Class of each channel 48. The power management module 64 includes a microprocessor or central processing unit (CPU) 66 that has access to storage or memory 68 that holds application software 70 with executable instructions executable by the CPU 66 used to manage both the Power Class of each channel 48. The memory 68 may be persistent writeable memory such as EEROM memory or other types of memory used in embedded systems.

The power management module may in possible embodiments be realized as a system on a chip (SoC) that may include the microcontroller along with other peripherals, including a graphics processing unit (GPU), a Wi-Fi module, one or more coprocessors, and the like.

The power management module 64 is capable of determining the power available to the APL field switch. The power management module 64 is operatively connected to the APL terminals 42, 44 and can determine whether voltage is being applied to the terminals. This enables the power management module 64 to determine whether the APL field switch 30 is being powered through the network trunk (the APL standard limits trunk power delivery) or through an external power supply with a power rating appropriate for the APL field switch.

The power management module 64 functions as a controller 64 connected to each current-limiting power protection module 56. The controller 64 sets the Power Class of each port by setting the current limit of the adjustable fuse of each module 54. To enable a user to dynamically set the Power Class of a port or ports, the controller 64 operating through its operating software 70 receives user input representing the port or ports and the desired Power Class of the port or port, reads the user input, and, in response to the user input, sets the current limit of the fuse connected to the port to the current limit associated with the desired Power Class.

The controller 64 can also control the ability of the APL field switch 30 to cascade power downstream through the APL trunk.

The controller 64 in embodiments of the APL field switch 30 receives user input from a touchpad display on the APL field switch itself, through an interconnecting wire or wireless communications line (for a non-limiting example, a serial USB cable) that communicates independently of the process control network, and/or through the process control network itself. The controller 64 may be configured to be seen as a field device on the process control network to receive user input through the process control network.

The application software 70 in the illustrated embodiment generates a graphical user interface (GUI) 72 for setting port Power Classes that is transmitted back to the user. The GUI 72, for example, can be provided via a web server provided by the application software 70 that displays the GUI on a web page. The controller 64 in the illustrated example transmits the GUI 72 to an application on the engineering workstation 16 via an interconnecting wired or wireless communications line or link 73 that enables two-way communication with the workstation 16. The controller 64 enables an engineer to communicate with the CPU 66 and the associated software and change the Power Class of some or all of the ports 50 of the APL field switch 30. The controller 64 also enables the user to enable or disable cascading capability of the APL field switch 30.

The CPU 66 is connected to the selectively adjustable current-limiting device 58 of each channel's current-limiting power protection module 56 through an I2C network 74. The I2C network protocol is a commonly used serial communication protocol.

Known types of selectably adjustable current-limiting devices that can be adapted for use with the present disclosure include, but are not limited to:
an eFuse connected to a selectable resistance;
a constant current limiting circuit;
a foldback current limiting circuit; and
a parallel resettable fuse arrangement of different amperage ratings arranged in series with relays that select which fuse is active.

An eFuse is an all-electronic, selectable-current-limiting fuse that when actuated stops current flow.

Figure 4:
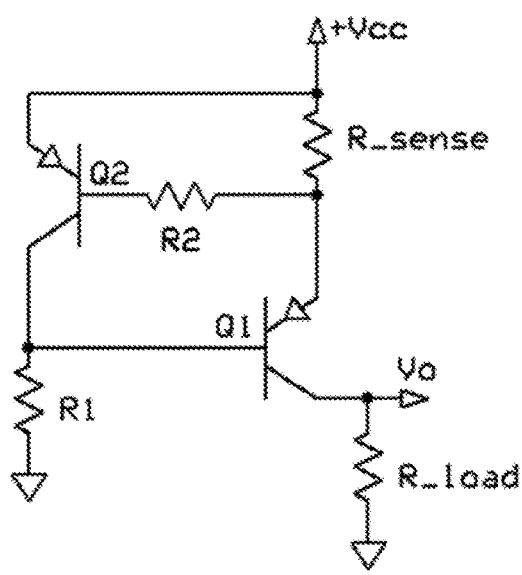
FIG. 4 is a schematic view of a constant current limiting circuit.

Constant current limiting circuits enable current to pass through until a maximum current is reached. The circuit then lowers the voltage to prevent current flow to exceed the maximum current flow. FIG. 4 illustrates an exemplar constant current-limiting circuit that can be adapted for use with the present disclosure.

Figure 5:
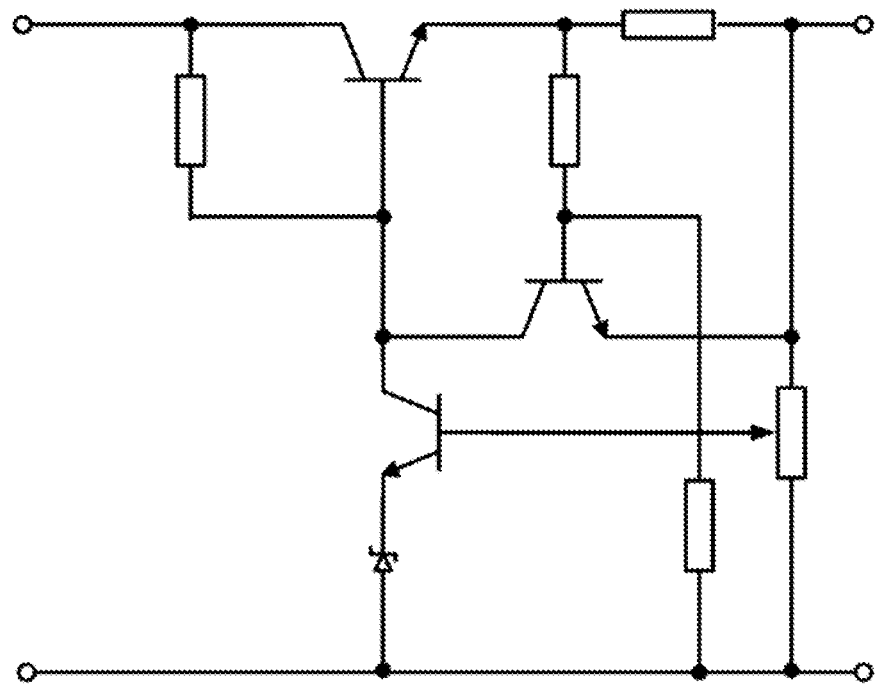
FIG. 5 is a schematic view of a foldback current limiting circuit.

Foldback current limiting circuits enable current to pass through until a maximum current is reached. The circuit lowers the voltage and current to prevent current flow from exceeding the maximum current flow. FIG. 5 illustrates an exemplar foldback current limiting circuit that can be adapted for use with the present disclosure. Image attribution: By Mikiemike at English Wikipedia, CC BY-SA 3.0, https://commons.wikimedia.org/w/index.php?curid=70852656.

Current limiting circuits utilize resistors to set the maximum current flow through the circuit. By utilizing variable-resistance resistors that enable dynamic selection of resistance in the design of these circuits, the maximum current flow through a circuit and hence the maximum power output of the circuit can be selected by selecting the resistance of the resistor.

Current limiting circuits can also be connected in series with a static switch driver such as the LTC7003 driver available from Analog Devices, Wilmington, Massachusetts, USA 01887 that enables sensing a relatively large voltage drop.

Figure 6:
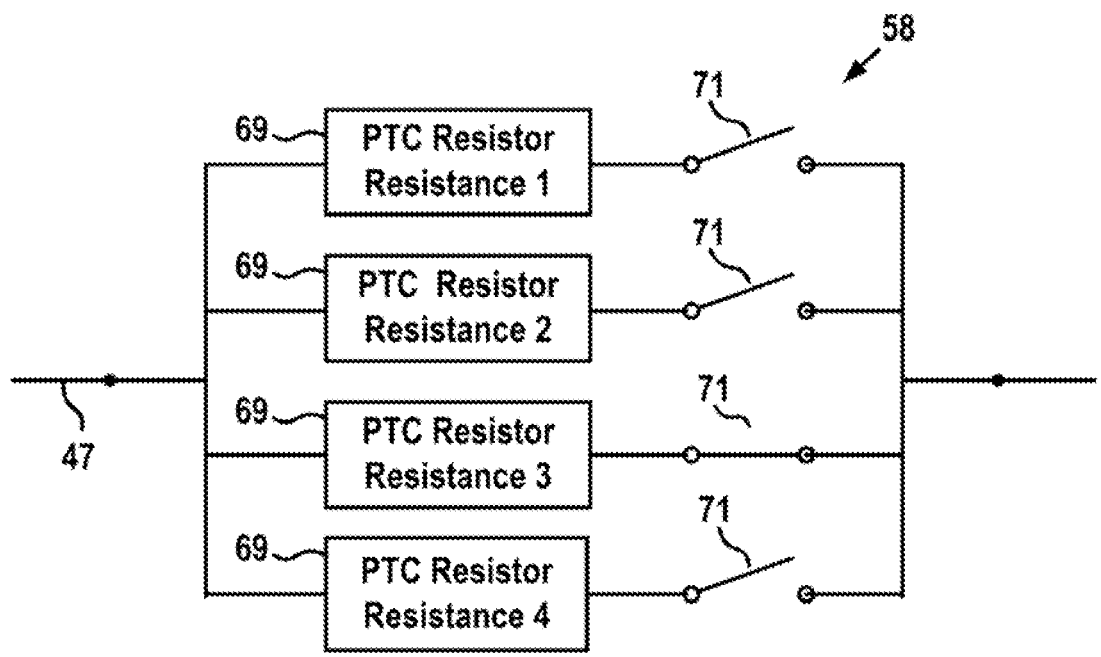
FIG. 6 is a schematic view of a parallel resettable fuse arrangement.

FIG. 6 illustrates a selectable current-limiting device 58 formed as a parallel fuse arrangement that includes Positive Temperature Coefficient (PTC) resettable fuses that can automatically reopen after cooling. PTC fuses that may be adapted for use in accordance with this disclosure may be obtained from Eaton, Electronics Division, Cleveland, Ohio USA. The fuses 69 are each arranged in series with a relay 71 connected to and controlled by the controller 68. Closing a relay and keeping the other relays open enables the controller 64 to selectably insert a selected one of the fuses 69 in the channel power line 47.

The current-limiting device 58 used with the illustrated APL field switch 30 includes an eFuse connected to a digital potentiometer. Efuses offer many advantages for controlling current flow. Efuses are available commercially as integrated circuit packages from Texas Instruments, Toshiba, STMicroelectronics, and other vendors. An eFuse should be selected based on amperage and voltage capacity, response speed, energy efficiency, and the like. Detailed information about eFuses and their operation are publicly available through product data sheets available from the manufacturers (for example, Texas Instruments Application Report SLVA862A "Basics of eFuses" published April 2018, Texas Instruments Publication SLVSDT4E published August 2019 describing the TPS2662x family of eFuses, and Texas Instruments Design Guide TIDA-010076 "Daisy-Chained Power and Data Over Single Pair Ethernet" published June 2020.

Figure 7:
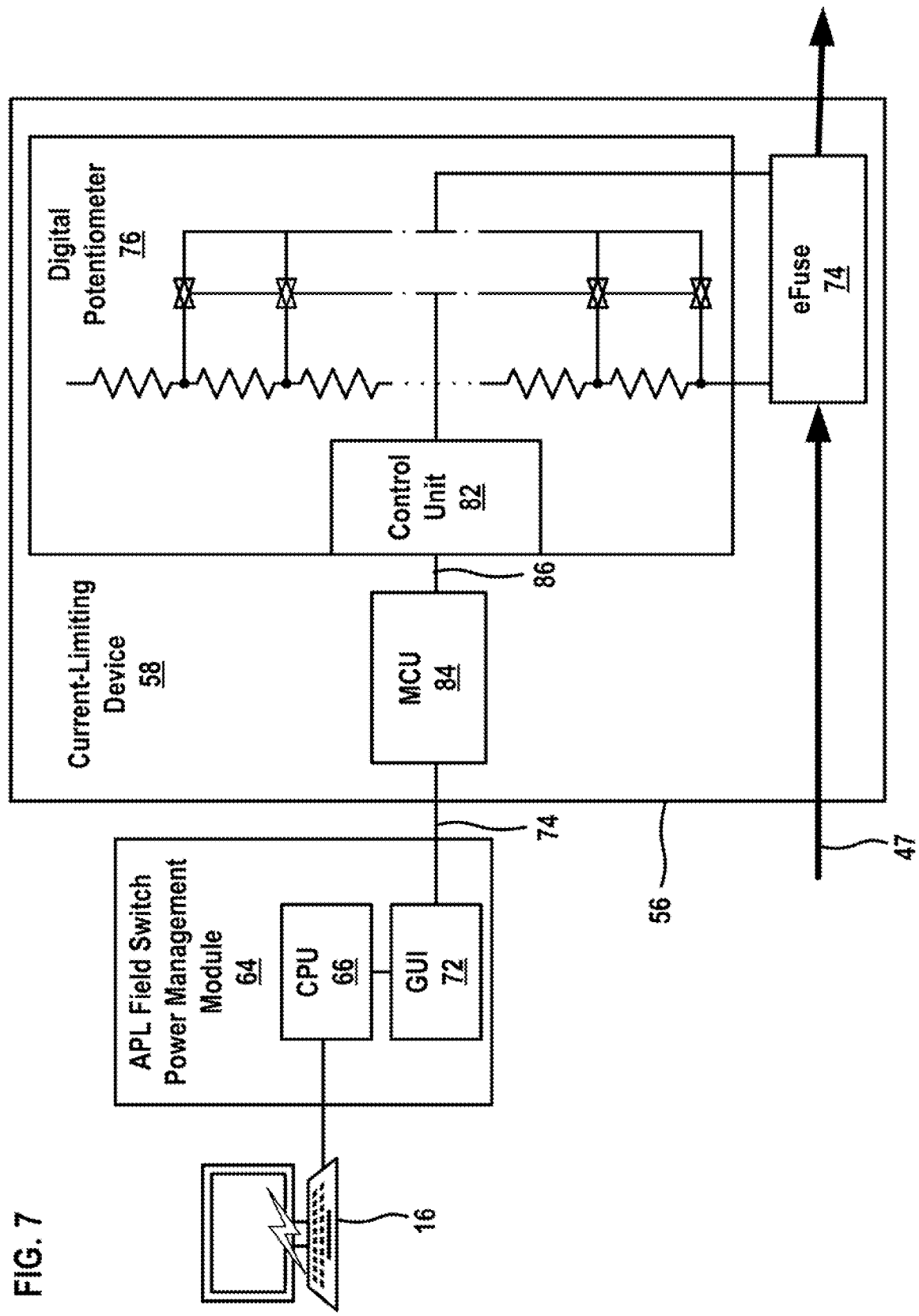
FIG. 7 is schematic view of the power management module shown in FIG. 3 connected to a first embodiment user-configurable current-limiting device in accordance with this disclosure.

FIG. 7 illustrates an embodiment of the user-power protection module 56 in which the current limiting device 58 includes an eFuse 74 connected to a digital potentiometer 76. The eFuse 74 is in line with the channel power line segment 49. The electrical current flowing through the channel power line 47 passes through the eFuse 74. The eFuse 74 enables a resistor to be connected to the eFuse 74 that sets the current limit that will open the eFuse. Connecting a variable-resistance resistor to the eFuse 74 enables the current limit to be selectively changed based on the selected resistance of the variable-resistance resistor.

Digital potentiometer integrated circuits are available from Analog Devices Inc., Microchip, Texas Instruments, and other suppliers.

The illustrated digital potentiometer 76 includes a resistor ladder 78 and an electronic switch 80 at each step of the ladder. In operation, one switch 80 is closed at a given time to determine the effective resistance of the digital potentiometer (similar to the action of a wiper of a conventional analog potentiometer).

The operating state of the set of switches 80 is controlled by a control unit 82 of the digital potentiometer that can receive external commands to set the resistance of the digital potentiometer. Digital potentiometers with control units compatible for connection to I2C and SPI serial networks are commercially available.

The digital potentiometer 76 enables the resistance that sets the eFuse current limit to be selectively changed to open the eFuse at different maximum current flows and hence different Power Classes.

Figure 8:
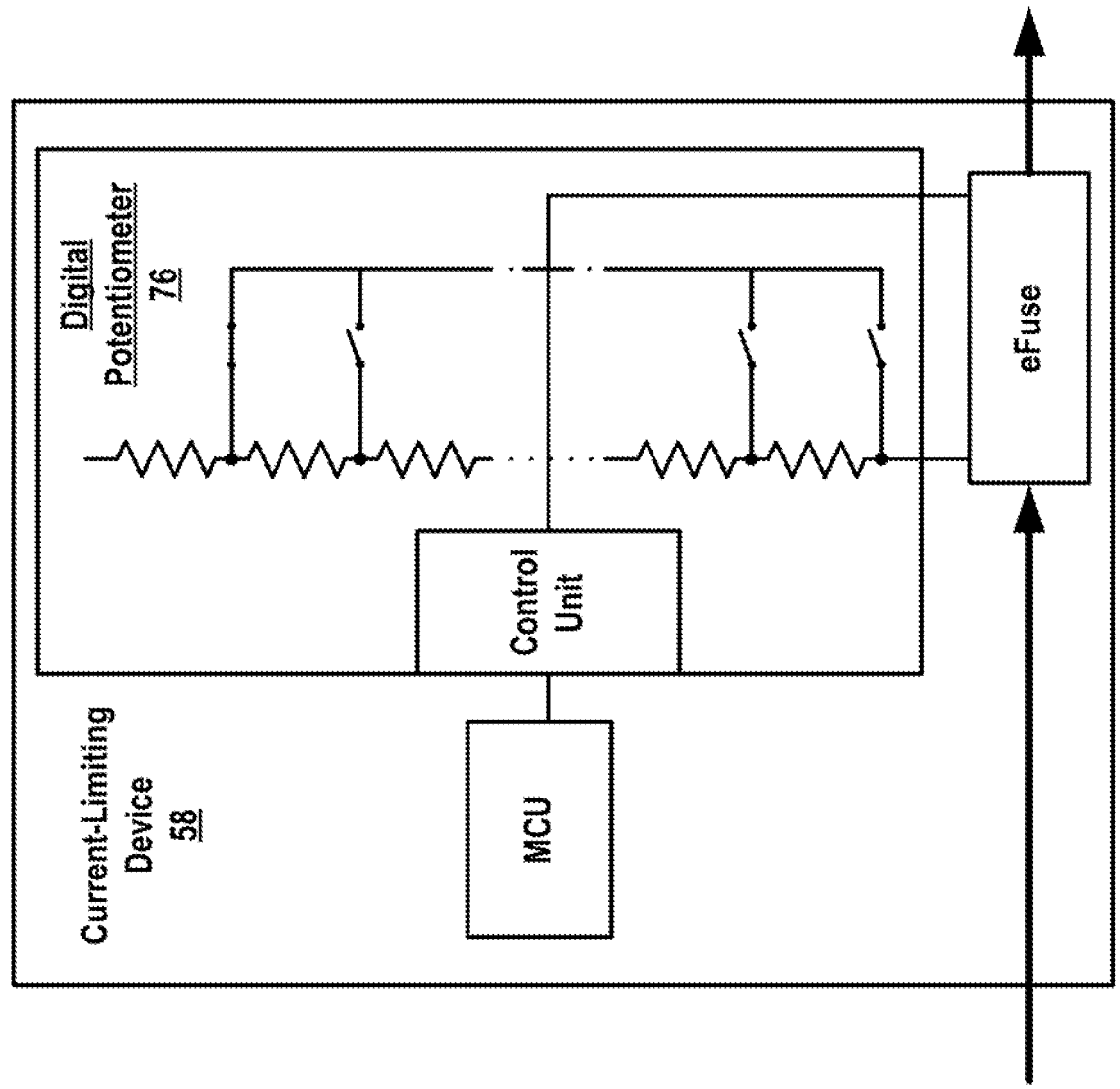
FIG. 8 is a schematic view of the current-limiting device shown in FIG. 7 in a first operating state associated with a first Power Class.

FIG. 8 illustrates the current-limiting power current limiting device 58 wherein the digital potentiometer 76 is set to a relatively high resistance suitable for setting a channel 48 to a lower power Port Class. A lower flow of current through the eFuse 74 will open the eFuse.

Figure 9:
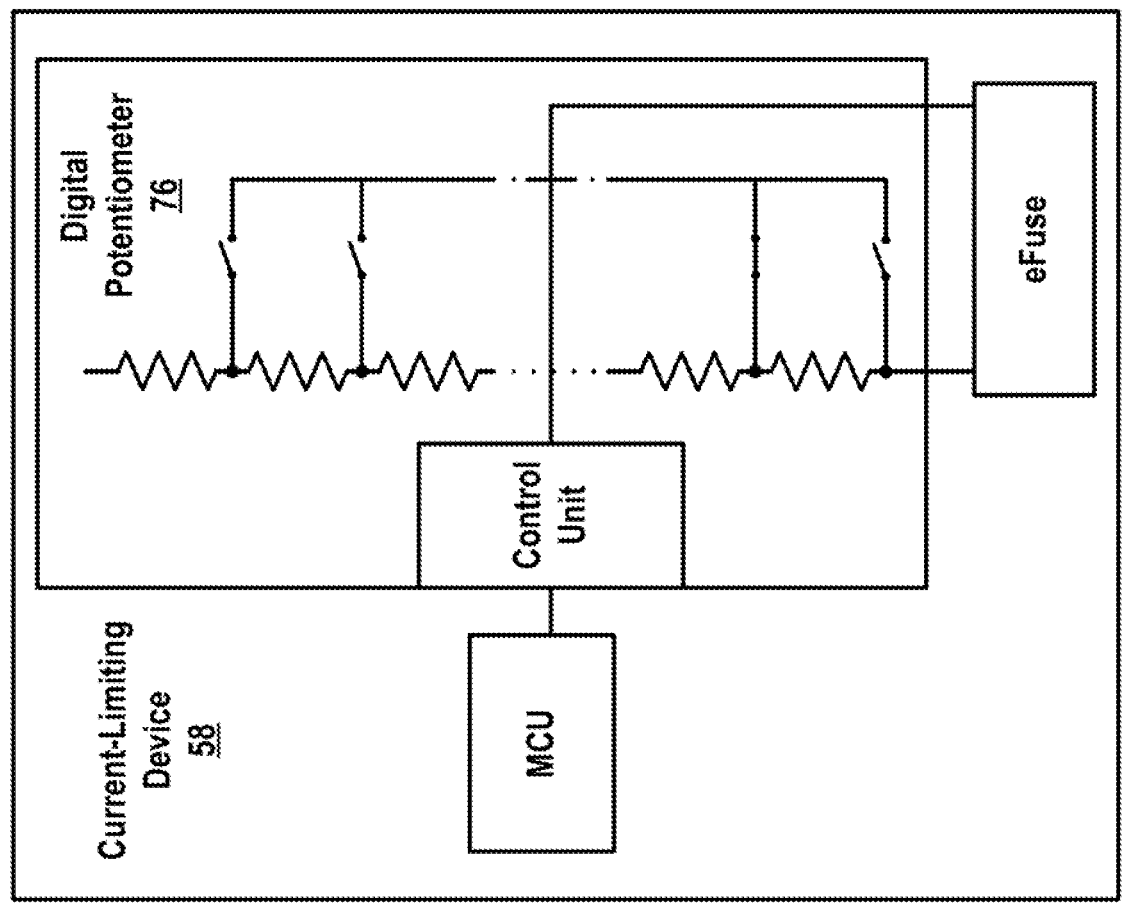
FIG. 9 is similar to FIG. 8 but illustrates the current-limiting device in a second operating state associated with a second Power Class.

FIG. 9 illustrates the current-limiting power protection module 56 wherein the digital potentiometer 76 is set to a relatively low resistance. This resistance is suitable for setting a channel 48 to a higher power Port Class. A higher current must flow through the eFuse 74 to open the eFuse as compared to the resistance state of the digital potentiometer 76 shown in FIG. 5.

Referring back to FIG. 7, the current-limiting device 58 includes a microprocessor or MCU 84 that is connected to the control unit 82 by a UART circuit 86. The MCU 84 communicates with the control unit 82 whereby the control unit 82 sets the desired resistance of the digital potentiometer 76.

The MCU 84 is connected to the CPU 66 of the power management module by the I2C network 74. The application software 70 has access to data applicable to the APL field switch 30 representing the Power Classes available for each channel 48, the number of channels of the APL field switch, the total power capacity available to the APL field switch, the digital potentiometer resistance associated with each Power Class, security and user authorizations, and the like. The CPU 66 can individually address each channel MCU 84 and is capable of directing the MCU 84 to set the desired resistance of the connected digital potentiometer 76 and thereby establish the Power Class of the channel as requested by the software application 70.

Figure 10:
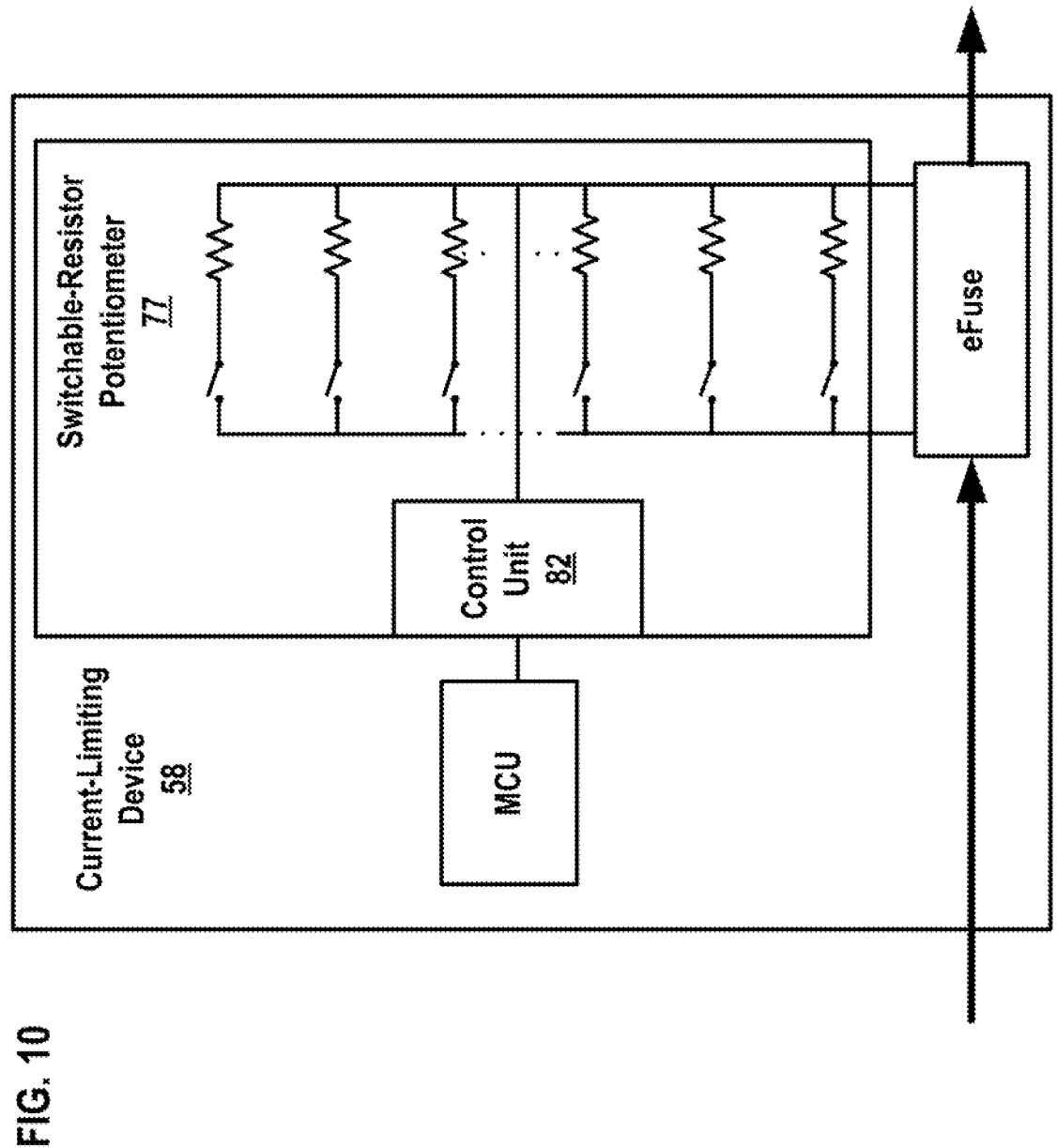
FIG. 10 is a schematic view of a second embodiment current-limiting device.

FIG. 10 illustrates a switchable-resistor type of digital potentiometer 77 that can be used in place of the ladder-type digital potentiometer 76. The switchable-resistor digital potentiometer 77 replaces the resistor ladder 78 with a number of parallel resistors, each resistor in series with a respective programmable switch. The resistors can vary in values of resistance. Each switch can be selectively opened or closed by the control unit 82 to obtain the desired resistance.

Figures 11, 12:
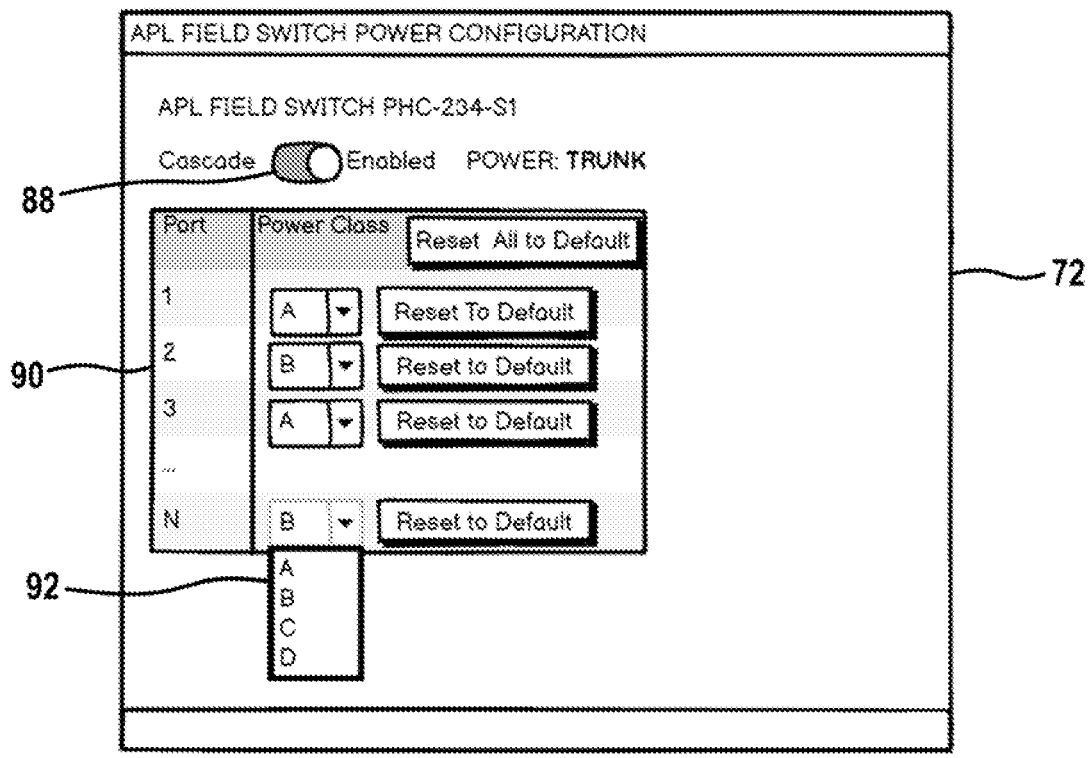
FIG. 11 illustrates an exemplar GUI used with the power management module shown in FIG. 2.
FIG. 12 illustrates an exemplar wireframe of a graphical user interface of a software application intended for use with the APL process control network shown in FIG. 1.

FIG. 11 illustrates a wireframe of an exemplar graphical user interface 72 presented by the application software 70. The user interface can be implemented using any number of GUI frameworks available for general computing applications or for embedded computer applications, and can be designed in accordance with acceptable best practices for layout, information and controls display, and user interactions.

The GUI 72 acting through the application software 70 can present error messages, display help screens and login screens, issue events for logging the use history of the GUI for archival purposes, and change data stored in the memory 68 reflecting the state of the APL field switch 30.

The illustrated GUI 72 displays the identity of the APL field switch 30, whether the field switch has cascading enabled, and the source of power (trunk or auxiliary power) of the field switch. Cascading can be enabled or disabled through a UI switch 88. If the field switch is being powered by a power source that does not allow cascading, the GUI displays cascading is disabled and the UI switch 88 is disabled as well.

The GUI 72 displays a data grid 90 with a data row for each port 50, each row displaying a respective port channel number and current Power Class of the port. The Power Class of the port is changed through a UI control such as the drop-box 92. When the user changes the Power Class through the GUI 72, the software application detects the change event. The software application 70 checks that the change in Power Class can be made in view of the current state of the APL field switch 30. For example, if the power currently being supplied to the ports 50 uses all available power, the application software 70 can prevent the user from changing a port's Power Class to a higher-power Power Class.

If the application software 70 finds a requested change in Power Class is possible, the application software 70 acting through the CPU 66 and the I2C network 74 communicates with the appropriate channel MCU 84 to change the resistance of the port's associated digital potentiometer 76 to the resistance associated with the requested Power Class. Upon confirmation of the change in resistance, the application software 70 updates the GUI 72 to reflect the change in port Power Class and can write the channel change to the memory 68.

If the application software 70 finds a change in Power Class is not possible, the GUI 72 displays the appropriate error message. The Power Class is not changed.

The illustrated GUI 72 also enables a user to reset all the ports 50 or each port 50 to an initial default Power Class if such a reset is permitted by the application software 70. The GUI 72 may request the controller 64 to change of Power Class of each port individually and wait for confirmation, or may request the controller 64 to change the Power Classes of multiple ports in a batch operation.

FIG. 12 illustrates an exemplar wireframe of the graphical user interface 94 of a software application intended for use with the APL process control network. The software application GUI 94 can be displayed on the engineering workstation 16 for example. The software application acts through the process control network 10 and requests data from each APL network field switch 30, 32 reflecting the current state of the APL field switch. The software application aggregates the data and presents it through the GUI 94. The illustrated GUI 94 displays a data grid 96 with a data row for each APL field switch, each row displaying the APL field switch ID, number of ports, number of active ports, and current power source for each APL field switch on the network. Each row also includes an edit link 98 that, on clicking, causes the GUI 72 of the APL field switch associated with that row to open on the workstation.

The software application 72 can, in possible embodiments, be designed to execute on a CPU not forming part of the APL field switch.

Figure 13:
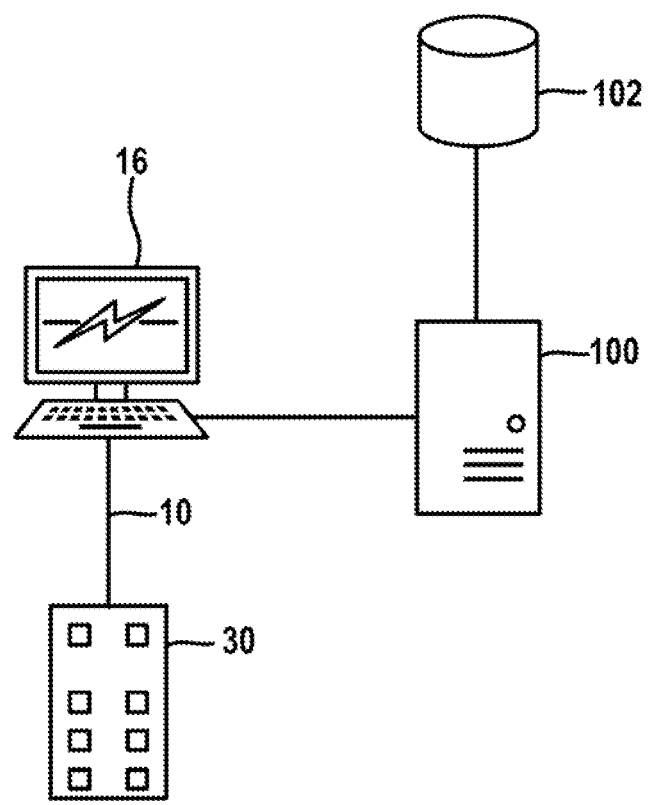
FIG. 13 schematically indicates a distributed computing network used in conjunction with the power management module shown in FIG. 2.

FIG. 13 illustrates use of the power protection module 64 forming part of a networked distributed computing system. The computing system includes a server 100 networked with the engineering workstation 16. The server 100 also has access to a database 102 local with the server. The database could be located in the back end or also be hosted in the Cloud or on another server remote from the server 100.

In this networked embodiment, the server 100 executes some or all of the software functions contained in the previously described software application 70 to offload some or all of the computer processing from the APL field switch to the server. Some or all of the computer processing can take place on computer hardware located remotely from the APL field switch.

The application GUI 72 is displayed on the engineering workstation 16. At application startup, the engineering workstation 16 queries the APL field switch 30 through the process control network 10 and receives data representing the current state of the APL field switch and field switch channels. User interactions with the GUI 72 are transferred between the workstation 16 and the server 100. The server 100 determines whether a proposed change in Power Class of a channel is possible.

If the port Power Class is to be changed, the engineering workstation 16 transmits a command to the APL field switch 30 to change the port's Power Class. The APL field switch CPU 66 through the I2C network 74 signals the appropriate MCU 84 to change the resistance of the port channel's digital potentiometer 76 to the resistance associated with the requested Power Class. The APL field switch 30 confirms the change in Power Class to the engineering workstation 16 and the GUI 72 is updated to reflect the change in Power Class.

The server 100 can store the data associated with the APL field switch and a history of changes in APL field switch state in the database 102. The server 100 can query the database 102 for the data needed for initially displaying the GUI 72 instead of having the APL field switch queried for that data.

Other distributed computing architectures are known and can be adapted to offload required computing power from the APL field switch 30.

A relay in accordance with this disclosure can be an analog relay, a transistor relay, a mechanical relay, or equivalent.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in the number of APL field switch ports, powering of the APL field switch, environment of use, Power Class power limits, and the like, as well as such changes and alterations that fall within the purview of the following claims.

The invention claimed is:

1. An APL field switch for an industrial control network that enables user-selectable dynamic power allocation to a connected field device, the APL field switch comprising:
   power terminals and data terminals that are each configured to receive power into the APL field switch, the data terminals being further configured to transmit data into and out of the APL field switch;
   a plurality of channels, each channel comprising a port and a channel power/data line connecting the port to the power terminals and data terminals;
   each port of the plurality of channels being configured to be connected to a two-wire APL spur for connecting the port to an APL field device through the APL spur, the port being associated with a default Power Class of a plurality of Power Classes;
   the channel power/data line of each channel being configured to transmit power from the power terminals to the channel port and to transmit data between the channel port and the data terminals, the channel power/data line comprising a power line segment connected to the channel port and configured to transmit electrical power received from the power terminals to the channel port;
   an adjustable power-limiting device being disposed in the power line segment, the power-limiting device being capable of being selectively operated in a plurality of respective operating states wherein when the power-limiting device is in one of the operating states of the plurality of operating states a respective maximum transmission of electrical power through the power-limiting device activates the power-limiting device and thereby limits, reduces, or stops the transmission of electrical power through the power line segment, each operating state being associated with a different Power Class; and
   a controller being connected to the power-limiting device of each channel of the plurality of channels, the controller comprising a computer software program incorporated in an executable non-transitory computer-readable medium for operating the controller, the controller being configured to receive a user input requesting the controller to set a Power Class of a selected port of the plurality of channels to a desired Power Class and in response to the user input issue a control signal through the connection to the power-limiting device connected to the selected port that sets the operating state of the power-limiting device to the operating state associated with the desired Power Class,
   whereby the user may selectively change the Power Class of each port to meet the needs of the industrial control network.

2. The APL field switch of claim 1 wherein the APL field switch is capable of making available a total maximum power to the ports of the field device, and the controller is configured to not change the Power Class of the selected port in response to the user input if changing the Power Class could cause the maximum power transmittable to the ports to exceed the available total maximum power of the APL field switch.

3. The APL field switch of claim 1 wherein the user input is transmitted from a computer-implemented user interface that is accessible from outside of the APL field switch.

4. The APL field switch of claim 3 wherein the user interface is a graphical user interface that lists each port of the plurality of channels, the current Power Class of each port of the plurality of channels, and enables the user to set the desired Power Class of a selected port of the plurality of channels for generating the user input to the controller.

5. The APL field switch of claim 4 wherein the GUI is generated by the controller software.

6. The APL field switch of claim 4 wherein the GUI is generated by software stored on an executable non-transitory computer-readable medium separate from the controller software.

7. The APL field switch of claim 3 wherein the user interface is operatively connectable to a database;
   the user interface is configured to store and retrieve data to and from the database needed by the user interface to enable a user to selectively allocate Power Classes among the ports of the plurality of channels.

8. The APL field switch of claim 7 wherein the database is stored on a server remote from the APL field switch.

9. The APL field switch of claim 3 wherein the controller is configured to receive a user input requesting the controller to set the Power Class of each port of the plurality of channels to the default Power Class of the port and in response to the user input issue control signals to the power-limiting devices connected to the ports that sets the operating state of each power-limiting device to the operating state associated with the default Power Class of the port attached to the power-limiting device.

10. The APL field switch of claim 9 wherein the user interface is operatively connectable to a database;
    the user interface is configured to store and retrieve data to and from the database needed by the user interface to enable a user to request the controller to set each port of the plurality of channels to the default Power Class of the port.

11. The APL field switch of claim 9 wherein the APL field switch comprises a first default set of port Power Class allocations when the APL field switch is powered through the data terminals and a second default set of port Power Class allocations different from the first set when the APL field switch is powered through the power terminals; and the controller is configured to set the Power Classes of the ports of the plurality of channels in accordance with the first default set of port Power Classes if the APL field switch is powered through the data terminals and to set the Power Classes of the ports of the plurality of channel in accordance with the second default set of port Power Classes if the APL field switch is powered through the power terminals when the controller receives the user input requesting the controller to set the Power Class of each port to the default Power Class of the port.

12. The APL field switch of claim 3 wherein the user interface is configured to display data to a user representing the current Power Classes assigned to the ports of the APL field switch and is further configured to query the APL field switch for the data displayed to user.

13. The APL field switch of claim 1 wherein the APL field switch is capable of cascading electrical power to another APL field switch and the controller is configured to receive a user input selectively allowing the APL field switch to cascade power or not allowing the APL field switch to cascade power.

14. The APL field switch of claim 1 wherein each power-limiting device of the plurality of channels is a current-limiting device.

15. The APL field switch of claim 14 wherein at least one current-limiting device of the plurality of channels comprises one of the following (a), (b), (c), and (d):

(a) an electronic fuse;
(b) a plurality of PTC fuses arranged in parallel, each PTC fuse in series with a relay connected to and controlled by the controller;
(c) a constant current limiting circuit; and
(d) a foldback current limiting circuit.

16. The APL field switch of claim 15 wherein the at least one current-limiting device comprises the electronic fuse, the electronic fuse being connected to a variable-resistance resistor having a selectable resistance selectable from a plurality of resistances;

the electronic fuse is configured such that the resistance of the resistor sets the maximum current flow through the electronic fuse that will activate the electronic fuse; and the controller is configured to transmit a control signal to the at least one current-limiting device that sets the resistance of the resistor.

17. The APL field switch of claim 16 wherein the variable resistor is a digital potentiometer.

18. The APL field switch of claim 16 wherein the variable resistor is a ladder-type digital potentiometer or a relay-type digital potentiometer.

19. The APL field switch of claim 1 wherein the controller is configured to set the Power Class of each port of the plurality of channels to a respective default Power Class in the absence of a user setting the Power Class of the port.

20. The APL field switch of claim 1 wherein the controller is configured to receive the input signal through at least one of (a) and (b): (a) a wired or wireless connection that is independent of the data terminals, and (b) a connection that transmits the input signal through the data terminals of the APL field switch.

* * * * *